United States Patent
Tanaka

[11] Patent Number: 5,842,719
[45] Date of Patent: Dec. 1, 1998

[54] ENERGY ABSORBING SHOULDER ANCHOR STRUCTURE

[75] Inventor: Hideki Tanaka, Aichi-ken, Japan

[73] Assignee: Kabushiki Kaisha Tokai-Rika-Denki-Seisakusho, Aichi-Ken, Japan

[21] Appl. No.: 739,191

[22] Filed: Oct. 30, 1996

[30] Foreign Application Priority Data

Nov. 20, 1995 [JP] Japan ................................ 7-301294

[51] Int. Cl.⁶ ............................ B60R 22/24; B60R 22/28
[52] U.S. Cl. ...................... 280/805; 280/808; 297/472; 297/483; 188/371
[58] Field of Search .................................. 280/805, 808, 280/801.1; 188/371, 377; 297/472, 471, 483

[56] References Cited

U.S. PATENT DOCUMENTS

| | | | |
|---|---|---|---|
| 3,198,288 | 8/1965 | Presunka | 188/377 |
| 3,586,131 | 6/1971 | Le Mire | 297/472 |
| 4,951,522 | 8/1990 | Chowdhury et al. | 188/371 |
| 5,529,344 | 6/1996 | Yasui et al. | 280/808 |

FOREIGN PATENT DOCUMENTS

| | | | |
|---|---|---|---|
| 1214104 | 4/1966 | Germany | 280/805 |
| 7-149204 | 6/1995 | Japan | |
| 7-172265 | 7/1995 | Japan | |
| 1289188 | 9/1972 | United Kingdom | |
| 2275175 | 8/1994 | United Kingdom | 280/805 |

OTHER PUBLICATIONS

British Search Report dated Jan. 8, 1997.

*Primary Examiner*—Peter C. English
*Attorney, Agent, or Firm*—Sixebey Friedman Leedom & Ferguson; Thomas W. Cole

[57] ABSTRACT

A shoulder anchor structure capable of reliably absorbing energy when a predetermined large load acts thereon and also capable of adjusting its energy absorption characteristic according to vehicle model. The shoulder anchor structure includes an energy absorbing member having a pair of deformation amplifying portions formed thereon. The deformation amplifying portions ensure a predetermined displacement stroke of an intermediate portion of the energy absorbing member. Further, the deformation amplifying portions can deform so as to absorb a load acting on an occupant during a secondary collision. Accordingly, there is no fear of separation of the energy absorbing member from a pillar inner panel before a predetermined amount of energy is absorbed. This makes it possible to reliably absorb the load acting on the occupant during the secondary collision.

16 Claims, 9 Drawing Sheets

ENERGY ABSORBING SHOULDER ANCHOR STRUCTURE

BACKGROUND OF THE INVENTION

1. Field of the Invention

The present invention relates to a shoulder anchor structure disposed at an upper portion of a center pillar of a vehicle so as to support an occupant restraining webbing in such a manner that an intermediate portion of the webbing is passed through the shoulder anchor.

2. Description of the Related Art

A so-called three-point seat belt apparatus is provided for the driver's seat and front passenger's seat of a vehicle. In such a seat belt apparatus, one end of a webbing for restraining an occupant is anchored to a winding shaft of a winding unit which is disposed in the vicinity of the lower end of the center pillar, while the other end of the webbing is anchored to an anchor plate which is fixed to the floor of the vehicle body at a position close to the lower end of the center pillar. An intermediate portion of the webbing is passed through a shoulder anchor (slip joint) to be supported thereby. The shoulder anchor is disposed in the vicinity of the upper end of the center pillar. To apply the webbing, a vehicle occupant brings a tongue plate, carried by the intermediate portion of the webbing, into engagement with a buckle device which is disposed upright at one side of a seat of the vehicle. By this operation, the three-point seat belt apparatus is brought into a fastened state in which the portion of the webbing extending from the shoulder anchor to the tongue plate serves as a shoulder webbing and the portion of the webbing from the tongue plate to the anchor plate serves as a lap webbing.

Heretofore, as a countermeasure to a secondary collision of an occupant—especially the head of the occupant—during a side crash of a vehicle, the addition of an energy absorbing structure to the shoulder anchor has been widely adopted. An example of such a structure is disclosed in Japanese Patent Application Laid-Open (JP-A) No. 7-172265. The structure disclosed in that patent publication will be described in brief.

As shown in FIG. 8, an opening 104 is formed at a predetermined position on a pillar inner panel 102 of a center pillar 100, and a shoulder anchor 106 is disposed in the opening 104. The shoulder anchor 106 includes an anchor body 110 through which is passed an intermediate portion of a webbing 108, a mounting bolt 112 which is inserted into the upper portion of the anchor body 110, a cylindrical spacer 114 which covers an axially intermediate portion of the mounting bolt 112, and a cover 116 which covers the upper portion of the anchor body 110.

In addition, around the opening 104 of the pillar inner panel 102 is disposed an energy absorbing member 118 in abutment with the pillar inner panel 102. Both upper and lower end portions of the energy absorbing member 118 are welded to the outside surface of the pillar inner panel 102, whereby the energy absorbing member 118 is fixed in place. A through hole is formed in the energy absorbing member 118 at a position corresponding to the opening 104 of the pillar inner panel 102, and a nut 120 is welded to the energy absorbing member 118 such that the nut 120 surrounds the through hole.

The shoulder anchor 106 is attached to the center pillar 100 by screwing the mounting bolt 112 into the nut 120 welded to the energy absorbing member 118.

When a vehicle having the shoulder anchor 106 shown in FIG. 8 undergoes a side crash, the head of an occupant may hit the cover 116 of the shoulder anchor 106 due to a reaction induced by the crash. This is called a secondary collision. In this case, the load of the secondary collision is transmitted from the anchor body 110 to the energy absorbing member 118 via the spacer 114. Consequently, as shown in FIG. 9, an intermediate portion of the energy absorbing member 118 deforms toward a pillar outer panel 122, whereby the secondary collision load acting on the occupant can be absorbed.

In the above structure, however, the energy absorbing member 118, which is a flat plate, is welded to the outside surface of the pillar inner panel 102 at upper and lower locations. Therefore, in order to allow the energy absorbing member 118 to deform as in FIG. 9 during a secondary collision, the pillar inner panel 102 is required to deform such that the vertical size of the opening 104 of the pillar inner panel 102 decreases. However, since the pillar inner panel 102 is a high-strength member, it can be considered that the pillar inner panel 102 fails to deform and that the vertical size of the opening 104 fails to decrease to a sufficient degree required for a predetermined energy absorption. Consequently, there is possibility that the upper and lower welded portions of the energy absorbing member 118 separate from the outside surface of the pillar inner panel before a predetermined amount of energy is absorbed.

Further, in the foregoing conventional structure, it is impossible to adjust the energy absorption characteristic in accordance with the model of a vehicle, because the mounting position of the shoulder anchor 106 relative to the energy absorbing member 118 cannot be adjusted.

SUMMARY OF THE INVENTION

In view of the foregoing, it is an object of the present invention to provide a shoulder anchor structure that can reliably absorb energy when a predetermined large load acts thereon.

Another object of the present invention is to provide a shoulder anchor structure in which the energy absorption characteristic can be adjusted in accordance with the model of a vehicle.

According to a first aspect of the present invention there is provided a shoulder anchor structure which includes a shoulder anchor body disposed at an upper portion of a center pillar of a vehicle and supporting an intermediate portion of an occupant restraining webbing which passes through the shoulder anchor body, an energy absorbing member disposed on the outer side of a pillar inner panel or of a reinforcing panel disposed between the pillar inner panel and pillar outer panel of the center pillar, and load transmission means for transmitting a large load to the energy absorbing member when such a large load acts on the shoulder anchor body from the interior of the passenger compartment to the exterior of the passenger compartment. The energy absorbing member is fixed to the reinforcing panel or the pillar inner panel on both sides of the load transmission means. Further, deformation amplifying portions are provided in the vicinity of fixing portions where the energy absorbing member is fixed to the reinforcing member or the pillar inner panel so that the portion of the energy absorbing member located between the fixing portions is allowed to displace within a predetermined stroke toward the exterior side.

In a shoulder anchor structure according to a second aspect of the present invention, in combination with the first aspect of the invention, there is further included a support member for bearing a large load transmitted from the load transmission means, the support member being disposed on the exterior side of the energy absorbing member, as well as means for adjusting the mounting position of the support member relative to the energy absorbing member.

According to the first aspect of the present invention, when a large load acts on the shoulder anchor body from the interior side to the exterior side of the passenger compartment, the large load is transmitted to the energy absorbing member via the load transmission means. Consequently, the deformation amplifying portions of the energy absorbing member, which portions are located near the fixing portions where the energy absorbing member are fixed to the reinforcing panel or the pillar inner panel, deform and the intermediate portion between those fixed portions of the energy absorbing member is displaced to the exterior side within a predetermined stroke, whereby the predetermined large load is absorbed.

Thus, since the energy absorbing member used in the shoulder anchor structure of the present invention is provided with the deformation amplifying portions, the absorption of energy is ensured without separation of the energy absorbing member from the reinforcing panel or from the pillar inner panel.

According to the second aspect of the present invention, since the support member for bearing a large load transmitted from the load transmission means is provided on the exterior side of the energy absorbing member and the adjusting means for adjusting the mounting position of the support member relative to the energy absorbing member is also provided, it is possible to change the mounting position of the support member relative to the energy absorbing member in accordance with the model of a vehicle to which the shoulder anchor structure of the invention is applied. Consequently, the energy absorbing characteristic of the energy absorbing member can be adjusted according to each model of a vehicle.

The above and other objects, features, and advantages of the present invention will become apparent from the following description and the appended claims, taken in conjunction with the accompanying drawings in which preferred embodiments of the present invention are shown by way of illustrative example.

DESCRIPTION OF THE PREFERRED EMBODIMENTS

An embodiment of the present invention will now be described with reference to FIGS. 1 to 6.

Figure 1:
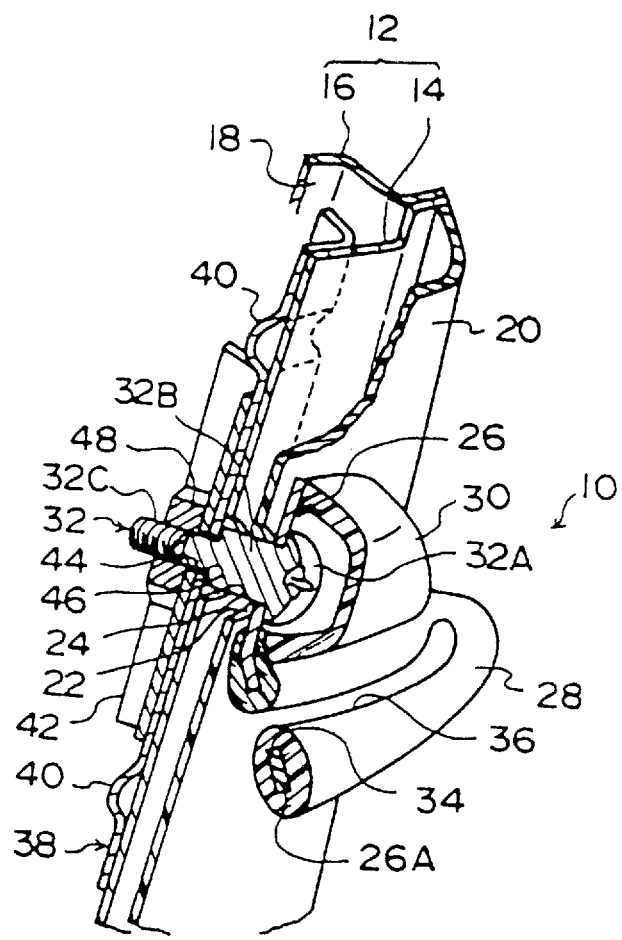
FIG. 1 is a perspective view showing a mounted state of a shoulder anchor according to an embodiment of the present invention.
Figure 2:
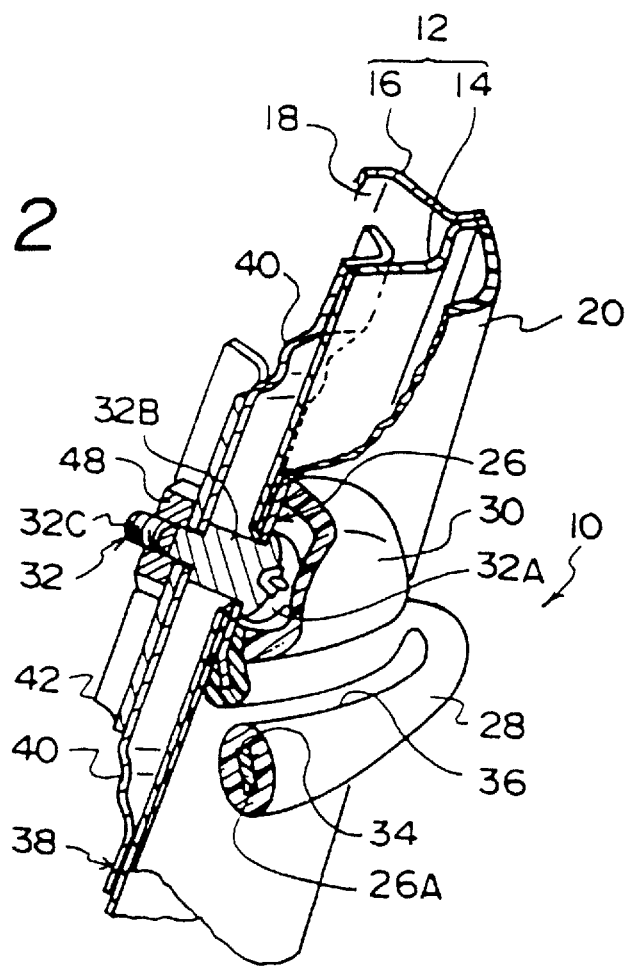
FIG. 2 is a perspective view showing a state of the shoulder anchor after a secondary collision.
Figure 3:
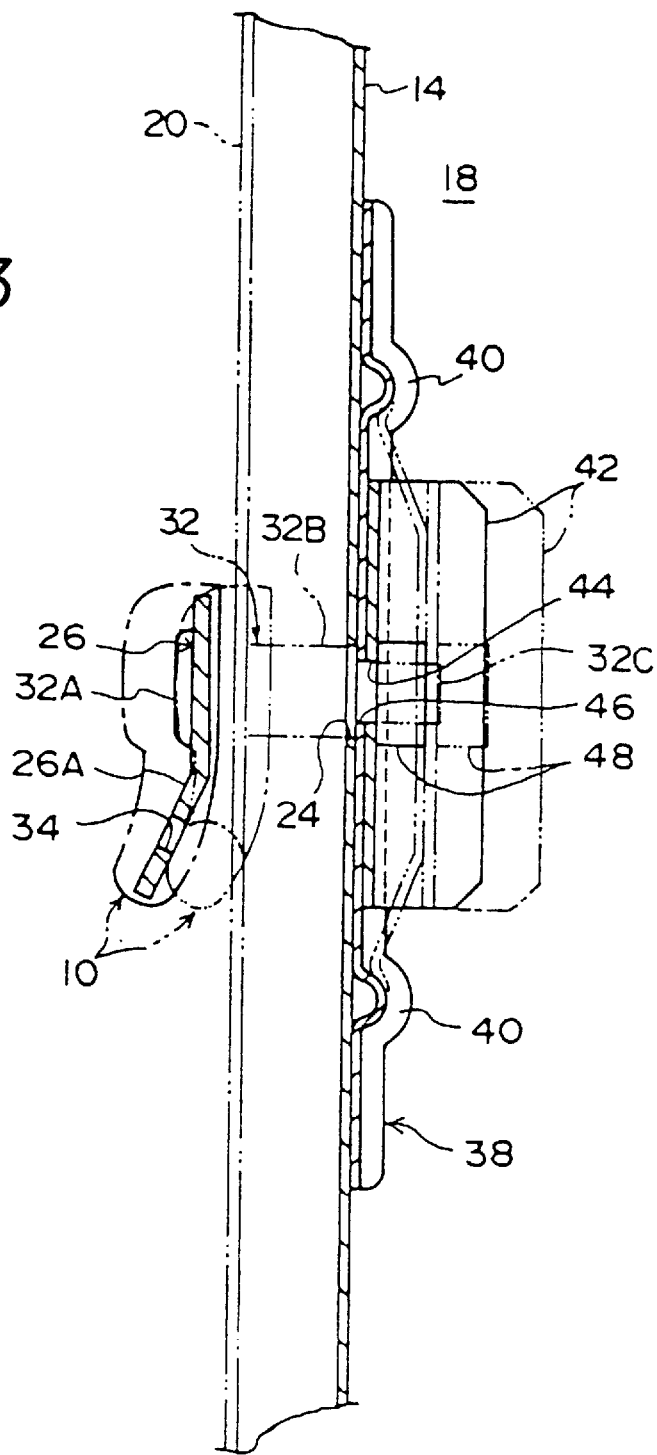
FIG. 3 is a vertical sectional view showing a state of the shoulder anchor before and after a secondary collision.
Figure 4:
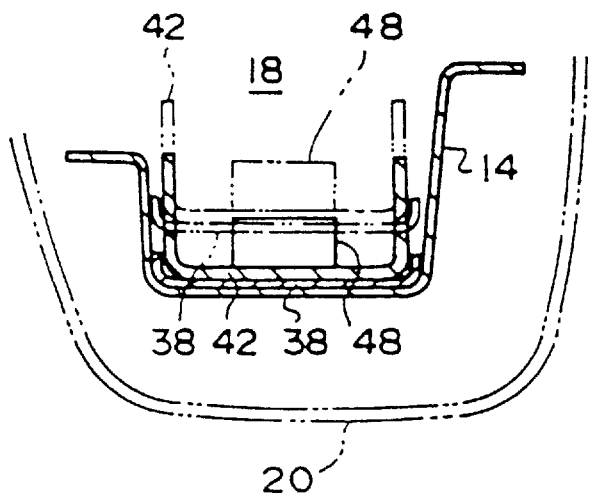
FIG. 4 is a horizontal sectional view showing a state of an energy absorbing member before and after a secondary collision.

FIG. 1 shows a mounted state of a shoulder anchor 10, FIG. 2 shows a state of the shoulder anchor after a secondary collision, FIG. 3 shows a vertical sectional view of the shoulder anchor 10 before and after a secondary collision, and FIG. 4 shows a horizontal sectional view of an energy absorbing member 38 before and after a secondary collision, which member 38 will be described in detail later.

As shown in those figures, the shoulder anchor 10 is disposed at the upper portion of a center pillar 12 of a vehicle to be located on the side of the passenger compartment. The center pillar 12 comprises a pillar inner panel 14 disposed on the passenger compartment side and a pillar outer panel 16 disposed on the exterior side. Both end portions of the pillar inner panel 14 and both end portions of the pillar outer panel 16, in the longitudinal direction of the vehicle, are welded together by spot welding, whereby the center pillar 12 is formed in the shape of a closed section. As a result, a predetermined space 18 is formed between the pillar inner panel 14 and the pillar outer panel 16.

On the passenger compartment side of the pillar inner panel 14 is disposed a pillar garnish 20 made of a resin. At a predetermined position of the pillar garnish 20 is formed a through hole 22 having a predetermined diameter, and in the pillar inner panel 14 is formed a through hole 24 to be coaxial with the through hole 22.

The shoulder anchor 10 comprises a metallic anchor body 26, which is a high-strength member, a lower cover portion 28 made of a resin and which covers a lower bent portion 26A of the anchor body 26, an upper cover portion 30 made of a resin and which covers the upper portion of the anchor body 26, and a mounting bolt 32 disposed such that it passes through the upper portion of the anchor body 26.

An elongated hole 34 is formed in the lower bent portion 26A of the anchor body 26, and the lower cover portion 28 is formed so as to also cover the inner peripheral surface of the elongated hole 34. Accordingly, the lower cover portion 28 is also formed with an elongated hole and this elongated hole is used as an insertion hole 36 through which is passed an intermediate portion of a webbing for restraining an occupant.

One end of the webbing is anchored to a winding shaft of a winding unit (not shown) disposed in the vicinity of the lower end of the center pillar 12, while the other end thereof is anchored to an anchor plate (not shown) which is fixed to the floor of the vehicle at a position near the lower end of the center pillar 12. To apply the webbing, a vehicle occupant brings a tongue plate, carried by the intermediate portion of the webbing, into engagement with a buckle device which is disposed upright at one side of a seat of the vehicle. By this operation, the three-point seat belt apparatus is brought into a fastened state in which the portion of the webbing portion extending from the shoulder anchor 10 to the tongue plate serves as a shoulder webbing and the portion of the webbing from the tongue plate to the anchor plate serves as a lap webbing.

An energy absorbing member 38 is disposed on the exterior-side surface of the pillar inner panel 14 in abutment therewith. The energy absorbing member 38 is formed of a rectangular plate having a squarish C-shaped section in which both transverse end portions are bent toward the outside of the passenger compartment.

Figure 5:
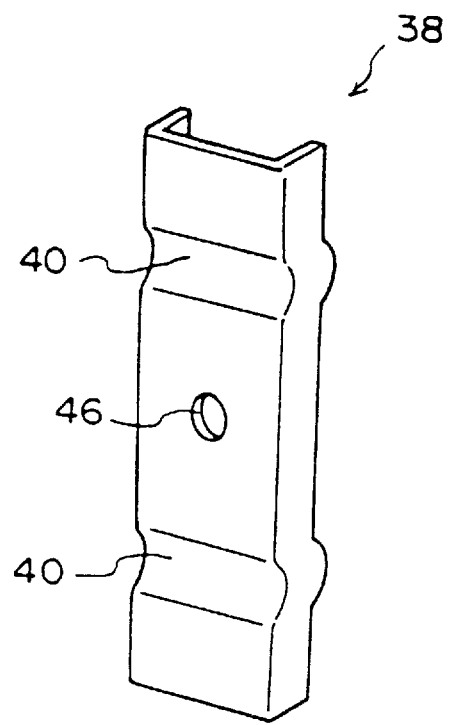
FIG. 5 is a perspective view of the energy absorbing member.

The upper and lower end portions of the energy absorbing member 38 are spot-welded to the exterior surface of the pillar inner panel 14. The fixing method for the energy absorbing member is not limited to spot welding. Other types of welding, or fixing elements such as nuts and bolts, may also be used. Further, as shown in FIG. 5, bead-like deformation amplifying portions 40 are integrally formed near both upper and lower ends of the energy absorbing member 38. Each of the deformation amplifying portions 40 is bent so as to have a wavy cross section.

A support plate 42 having a squarish C-shaped section is fixed to the exterior-side surface of the energy absorbing member 38 by spot welding. The fixing method is not always limited to spot welding. Other types of welding, or fixing elements such as nuts and bolts, may be used. Small through holes 44 and 46, smaller in diameter than both through hole 22 of the pillar garnish 20 and the through hole 24 of the pillar inner panel 14, are formed in the support plate 42 and the energy absorbing member 38, respectively, such that the small through holes 44 and 46 become coaxial with the through holes 22 and 24. Further, a nut 48 is welded onto the exterior-side surface of the support plate 42 so as to surround the small through hole 44.

The mounting bolt 32 for mounting the shoulder anchor 10 to the upper portion of the center pillar 12 has a head portion 32A, an intermediate portion 32B having a diameter smaller than that of the head portion 32A and having a smooth peripheral surface, and a tip portion 32C having a diameter smaller than that of the intermediate portion 32B and having an external thread formed on the peripheral surface thereof. The diameter of the intermediate portion 32B is designed to be slightly smaller than both the diameter of the through hole 22 formed in the pillar garnish 20 and that of the through hole 24 formed in the pillar inner panel 14.

The diameter of the tip portion 32C is designed to be slightly smaller than the diameter of the small through holes 44 and 46 of the support plate 42 and the energy absorbing member 38, respectively.

Next, a description will be given of the operation and effect of the present embodiment.

In the event of a side crash, a reaction resulting from the side crash may cause a secondary collision of the occupant's head with the shoulder anchor 10. Upon occurrence of such a secondary collision, a predetermined large load acts on the anchor body 26 of the shoulder anchor 10 from the passenger compartment side toward the exterior side.

The said large load (a secondary collision load) is transmitted directly from the anchor body 26 to the energy absorbing member 38 through the intermediate portion 32B of the mounting bolt 32. Part of the load is transmitted indirectly to the energy absorbing member 38 via the tip portion 32C of the mounting bolt 32, the weld nut 48 and the support plate 42. As a result, the paired deformation amplifying portions 40 disposed near the upper and lower ends, respectively, of the energy absorbing member 38 undergo a tensile deformation and the intermediate portion of the energy absorbing member 38 is displaced by a predetermined stroke toward the pillar outer panel 16. At this time, the secondary collision load acting on the occupant is absorbed by the deformation of the paired deformation amplifying portions 40.

Figure 6A:
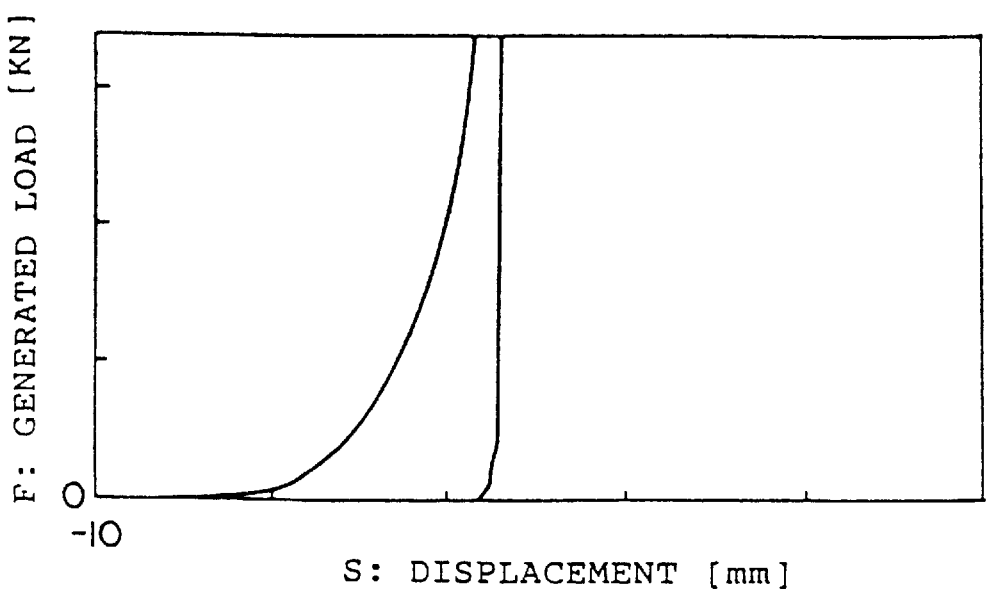
FIG. 6A is a graph showing an energy absorption characteristic obtained by using a shoulder anchor not provided with an energy absorbing structure.
Figure 6B:
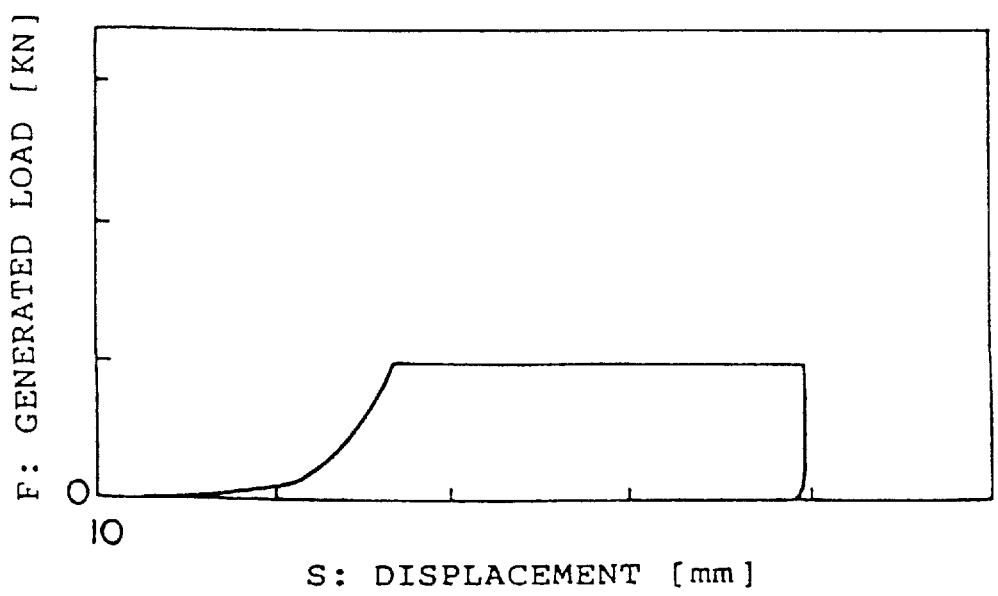
FIG. 6B is a graph showing an energy absorbing characteristic obtained by using the shoulder anchor according to the embodiment of the present invention.

FIG. 6A shows an energy absorption characteristic obtained by using a shoulder anchor not provided with any energy absorbing structure. As shown in the graph of FIG. 6A, when there is used a shoulder anchor not provided with any energy absorbing structure, the load acting on the occupant upon occurrence of a secondary collision is large. In contrast therewith, as shown in the graph of FIG. 6B, when there is used the shoulder anchor 10 provided with the energy absorbing structure according to this embodiment of the present invention, the load acting on the occupant during a secondary collision is low.

Thus, in this embodiment, the paired deformation amplifying portions 40 which ensure a displacement stroke of the energy absorbing member 38 and which absorb the secondary collision load acting on the occupant through their deformations are provided in the energy absorbing member 38. Consequently, such secondary collision load acting on the occupant can be absorbed reliably without causing separation of the energy absorbing member 38 from the pillar inner panel 14.

In the structure of the embodiment described above, the mounting position of the support plate 42 relative to the energy absorbing member 38 cannot be changed. The present invention is not limited to that structure. An adjusting means may be added so as to adjust the mounting position of the support plate 42 relative to the energy absorbing member 38.

Figure 7A:
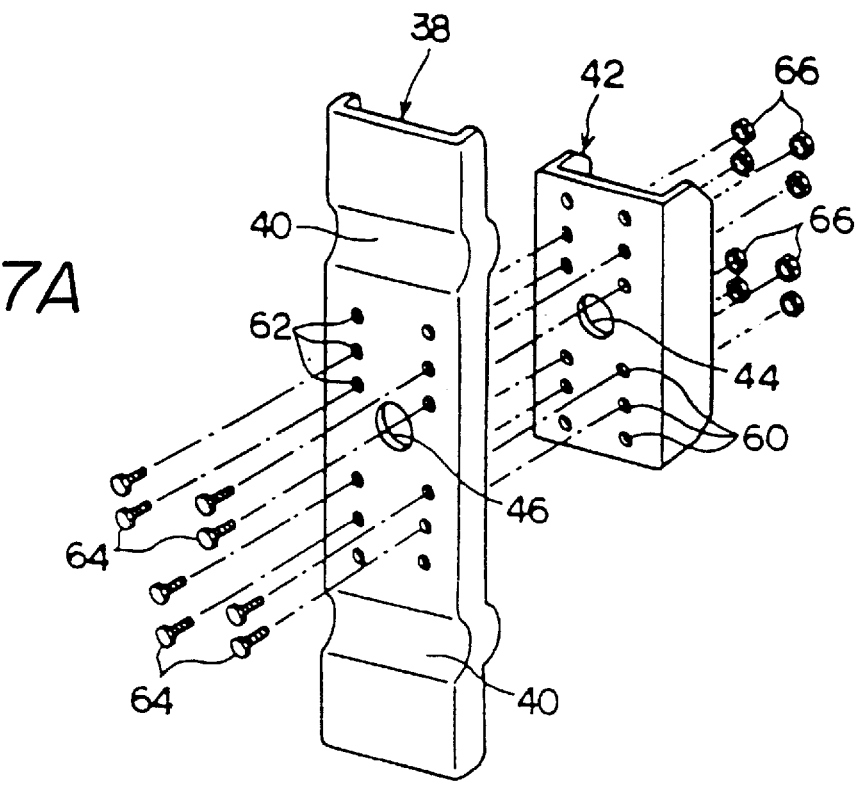
FIGS. 7A and 7B are perspective views each showing an energy absorbing member and a support plate according to another embodiment of the present invention.

As such an adjusting means there may be adopted the structure shown in FIG. 7A, in which mounting holes 60 and 62 are formed in a plurality of rows on upper and lower sides of the small through holes 44 and 46 of the support plate 42 and the energy absorbing member 38. When the support plate 42 is fixed to the energy absorbing member 38, bolts 64 are inserted into the mounting holes 60 and 62 in two adjacent rows on either side of the small through holes 44 and 46 and the bolts 64 are tightened with nuts 66.

In this structure, when the shoulder anchor 10 is attached to the center pillar 12, the mounting position of the support plate 42 relative to the energy absorbing member 38 can be changed in two steps according to vehicle model. As a result, the energy absorption characteristic of the energy absorbing member 38 can be adjusted in two steps according to vehicle model. Thus, it is possible to enhance the degree of freedom in selecting an energy absorption characteristic.

Figure 7B:
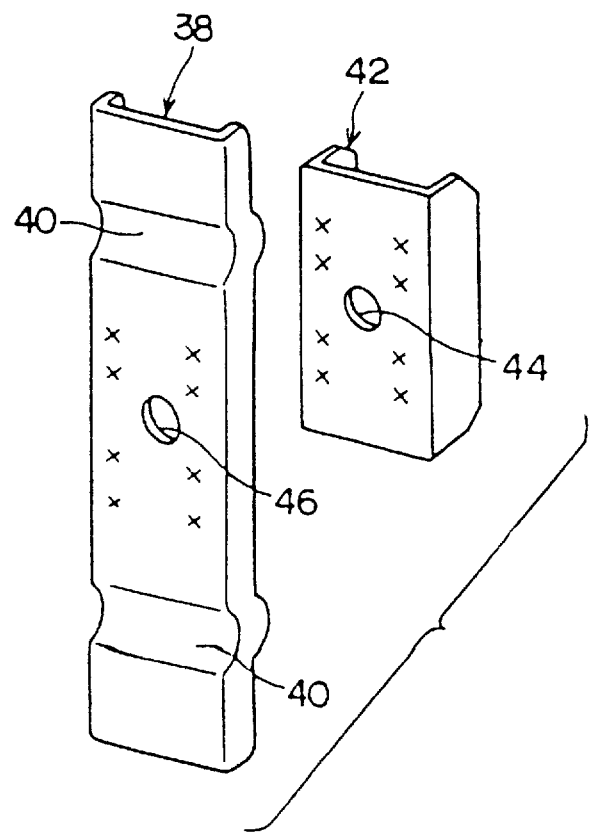
Figure 8:
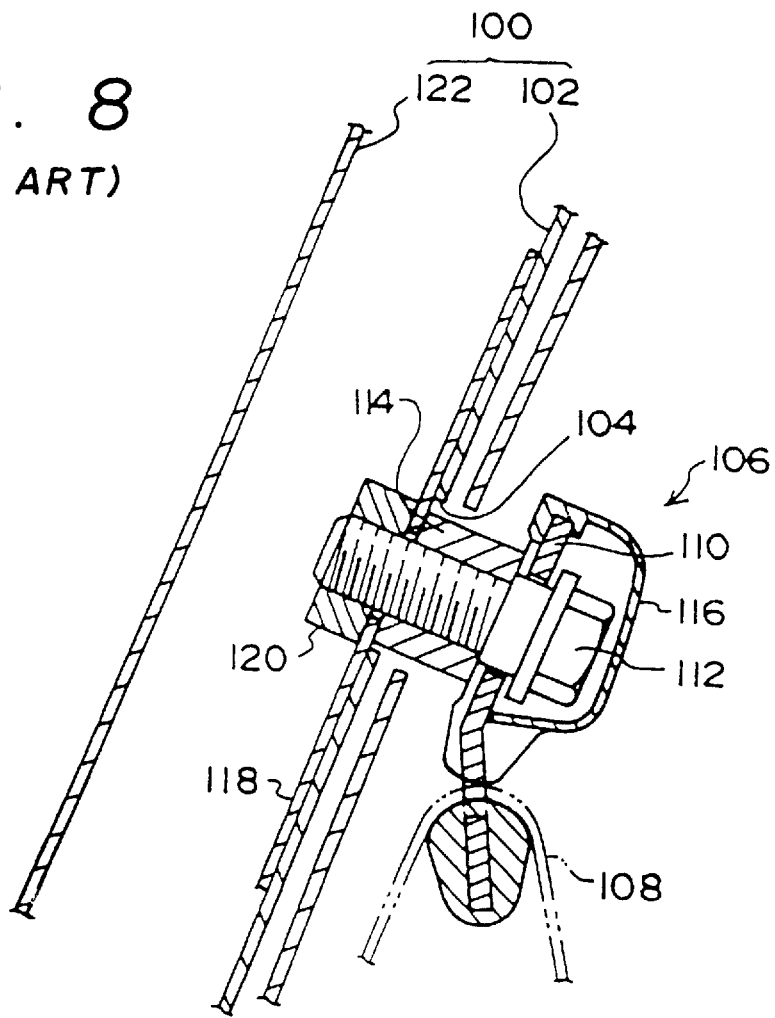
FIG. 8 is a vertical sectional view showing a state of a conventional shoulder anchor structure before a secondary collision.
Figure 9:
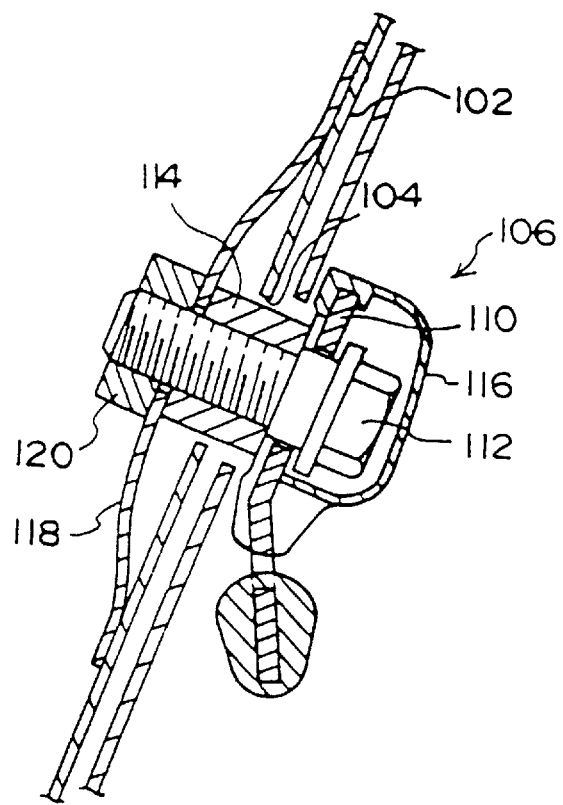
FIG. 9 is a vertical sectional view showing a state of the shoulder anchor structure of FIG. 8 after the secondary collision.

In the case where spot welding is adopted as the fixing means, as shown in FIG. 7B, the same function and effect as those in the use of the above bolt-nut fixing means can be obtained by suitably changing the spotting position in spot welding. The fixing means is not limited to the use of bolts 64 and nuts 66 or spot welding. Screws or rivets may be used, for example.

Although in the present embodiment, the deformation amplifying portions 40 are formed by bending predetermined portions of the energy absorbing member 38 into a wavy sectional shape, any other structure may be employed insofar as it can ensure the displacement stroke of the energy absorbing member and it can deform so as to absorb energy. For example, in the case where the energy absorbing member is formed of a flat plate, instead of providing the deformation amplifying portions, the energy absorbing member may be folded so that doubled portions are formed at positions corresponding to the deformation amplifying portions. There also may be adopted a structure wherein a plurality of small holes are formed in the portions of the energy absorbing member corresponding to the deformation amplifying portions 40 so as to decrease the rigidity of those portions to such an extent as to prevent breakage. In this case, the intermediate portion of the energy absorbing member is displaced to the exterior side while the low-rigidity portions having the small holes are pulled and become thinner.

In the above-described embodiment, the shoulder anchor 10 is fixed to the pillar inner panel 14 of the center pillar 12 which comprises the pillar inner panel 14 and the pillar outer panel 16. However, in the case where the center pillar has a reinforcing panel interposed between the pillar inner panel 14 and the pillar outer panel 16, the shoulder anchor 10 may be fixed to the reinforcing panel.

As described above, the shoulder anchor structure of the present invention has excellent effects in that the absorption of energy can be effected reliably when a predetermined large load acts thereon and that the energy absorption characteristic can be adjusted in accordance with the model of a vehicle.

While the embodiments of the present invention, as herein disclosed, constitute a preferred form, it is to be understood that other forms might be adopted.

What is claimed is:

1. A shoulder anchor structure comprising:

a shoulder anchor body disposed at an upper portion of a center pillar of a vehicle and supporting an intermediate portion of an occupant restraining webbing which passes through said shoulder anchor body;

an energy absorbing member including a plate having a substantially C-shaped cross section whose transverse ends are bent toward an exterior of a passenger compartment and disposed between a pillar inner panel and a pillar outer panel of the center pillar;

load transmission means having two sides for transmitting a large load to said energy absorbing member when such a large load acts on said shoulder anchor body from an interior of the passenger compartment to the exterior of the passenger compartment, said energy absorbing member fixed to the pillar inner panel on the two sides of said load transmission means, and deformation amplifying portions provided in the vicinity of fixing portions where said energy absorbing member is fixed to the pillar inner panel so that a portion of said energy absorbing member located between the fixing portions is allowed to displace within a predetermined stroke toward an exterior side.

2. A shoulder anchor structure according to claim 1, wherein each of said deformation amplifying portions is bent to have a wavy cross section.

3. A shoulder anchor structure according to claim 1, wherein said energy absorbing member is spot-welded to one of a reinforcing panel and the pillar inner panel at predetermined fixing positions.

4. A shoulder anchor structure according to claim 1, wherein said energy absorbing member is fixed to one of a reinforcing panel and the pillar inner panel at predetermined fixing positions.

5. A shoulder anchor structure according to claim 1, wherein said load transmission means comprises a mounting bolt which is disposed so as to pass through said shoulder anchor body.

6. A shoulder anchor structure according to claim 1, further comprising:

a support member disposed on an exterior side of said energy absorbing member and adapted to bear a large load transmitted from said load transmission means, said support member having opposing ends mounted between opposing ends of said energy absorbing member; and adjusting means for providing at least two mounting positions between the opposing ends of said support member and the opposing ends of said energy absorbing member to adjust the energy absorbing characteristics of said energy absorbing member.

7. A shoulder anchor structure according to claim 6, wherein said support member is a support plate which has a substantially C-shaped cross section and whose opposing ends are mounted onto an exterior-side surface of said energy absorbing member.

8. A shoulder anchor structure according to claim 6, wherein said adjusting means comprises:

a plurality of holes formed in a plurality of rows on upper and lower ends of said support member and said energy absorbing member, respectively; and bolts and nuts for fixing said ends of said support member between said ends of said energy absorbing member using said plurality of holes, thereby allowing a change in the mounting position between said ends of said support member and said ends of said energy absorbing member.

9. A shoulder anchor structure according to claim 1, wherein each of said deformation amplifying portions include structurally weakened portions which deform in response to a tensile force above a predetermined magnitude.

10. A shoulder anchor structure comprising:

a shoulder anchor body disposed at an upper portion of a center pillar of a vehicle and supporting an intermediate portion of an occupant restraining webbing which passes through said shoulder anchor body;

an energy absorbing member disposed between a pillar inner panel and a pillar outer panel of the center pillar;

load transmission means having two sides for transmitting a large load to said energy absorbing member when such a large load acts on said shoulder anchor body from an interior of a passenger compartment to an exterior of the passenger compartment, said energy absorbing member fixed to the pillar inner panel on the two sides of said load transmission means, deformation amplifying portions provided in the vicinity of fixing portions where said energy absorbing member is fixed to the pillar inner panel so that a portion of said energy absorbing member located between the fixing portions is allowed to displace within a predetermined stroke toward an exterior side, a support member disposed on an exterior side of said energy absorbing member and having opposing ends mounted at points between opposing ends of said energy absorbing member and adapted to bear a large load transmitted from said load transmission means, and adjusting means for adjusting the position of mounting points between said ends of said support member and the ends of said energy absorbing member.

11. A shoulder anchor structure according to claim 10, wherein each of said deformation amplifying portions is bent to have a wavy cross section.

12. A shoulder anchor structure according to claim 10, wherein said energy absorbing member is a plate having a substantially C-shape cross section whose transverse ends are bent toward the exterior of the passenger compartment.

13. A shoulder anchor structure according to claim 10, wherein said support member is a support plate which has a substantially C-shaped cross section and opposing ends which are fixed to an exterior-side surface of said opposing ends of said energy absorbing member, and said adjusting means comprises a plurality of holes formed in a plurality of rows on each of said ends of said support member and said energy absorbing member, respectively, and bolts and nuts for fixing said ends of said support member between said ends of said energy absorbing member using said plurality of holes, thereby allowing a change in the position of said mounting points between said ends of said support member and the ends of said energy absorbing member.

14. A shoulder anchor structure according to claim 10, wherein each of said deformation amplifying portions include structurally weakened portions which deform in response to a tensile force above a predetermined magnitude.

15. A shoulder anchor structure comprising:

a shoulder anchor body disposed at an upper portion of a center pillar of a vehicle and supporting an intermediate portion of an occupant restraining webbing which passes through said shoulder anchor body;

an energy absorbing member disposed between a pillar inner panel and a pillar outer panel of the center pillar; and load transmission means have two sides for transmitting a large load to said energy absorbing member when such a large load acts on said shoulder anchor body from an interior of a passenger compartment to an exterior of the passenger compartment, said energy absorbing member having opposing ends fixed to the pillar inner panel on the two sides of said load transmission means, deformation amplifying portions provided in the vicinity of fixing portions where said energy absorbing member is fixed to the pillar inner panel so that a portion of said energy absorbing member located between the fixing portions is allowed to displace within a predetermined stroke toward an exterior side, a support member having opposing ends disposed between and mounted onto an exterior side of the opposing ends of said energy absorbing member and adapted to bear a large load transmitted from said load transmission means, and adjusting means for adjusting the position of said mounting between the ends of said support member and the ends of said energy absorbing member, wherein each of said deformation amplifying portions is bent to have a wavy cross section, and said adjusting means including a plurality of holes formed in a plurality of rows on upper and lower ends of said support member and said energy absorbing member, respectively, and bolts and nuts for fixing said support member to said energy absorbing member using selected ones of said plurality of holes, thereby allowing a change in the mounting position between said ends of said support member and the ends of said energy absorbing member.

16. A shoulder anchor structure comprising:

a shoulder anchor body disposed at an upper portion of a center pillar of a vehicle and supporting an intermediate portion of an occupant restraining webbing which passes through said shoulder anchor body;

an energy absorbing member including a plate having a substantially C-shaped cross section disposed between a pillar inner panel and a pillar outer panel of the center pillar;

load transmission means having two sides for transmitting a large load to said energy absorbing member when such a large load acts on said shoulder anchor body from an interior of a passenger compartment to an exterior of the passenger compartment, said energy absorbing member fixed to the pillar inner panel on the two sides of said load transmission means, and deformation amplifying portions including bent portions in said plate provided in the vicinity of fixing portions where said energy absorbing member is fixed to the pillar inner panel so that a portion of said energy absorbing member located between the fixing portions is allowed to displace within a predetermined stroke toward an exterior side.

\* \* \* \* \*